United States Patent [19]

Ichinose et al.

[11] Patent Number: 4,859,035

[45] Date of Patent: Aug. 22, 1989

[54] FERROELECTRIC LIQUID CRYSTAL LIGHT SHUTTER DEVICE AND METHOD OF CONTROLLING THE DRIVING OF THE SAME

[75] Inventors: Hideo Ichinose; Shohei Naemura, both of Tokyo, Japan

[73] Assignee: NEC Corporation, Japan

[21] Appl. No.: 54,386

[22] Filed: May 26, 1987

[30] Foreign Application Priority Data

May 26, 1986 [JP] Japan .................................. 61-121576
May 30, 1986 [JP] Japan .................................. 61-126582

[51] Int. Cl.$^4$ ........................ G02F 1/13; G09G 3/00; G09G 3/20
[52] U.S. Cl. .................................. 350/332; 350/333; 350/350 S; 340/767; 340/793
[58] Field of Search .................... 350/350 S, 332, 333; 340/793, 767

[56] References Cited

U.S. PATENT DOCUMENTS 4,608,558  8/1986  Amstutz et al. ................. 350/350 S

FOREIGN PATENT DOCUMENTS 60-172029   9/1985  Japan .
60-263124  12/1985  Japan .
2163273     2/1986  United Kingdom ............ 350/350 S
2178582     2/1987  United Kingdom ................ 350/332

OTHER PUBLICATIONS

Kohji Iwasa, "A Ferroelectric Liquid Crystal Display", the subject No. 17, A New Liquid Crystal Display and Some Problems Thereof, in 1985 Electric-Information Correlated Institute Combined Assembly.

Yuzuru Sato, "The 31st Research Meeting Paper" of A Group (Liquid Crystal Group) in No. 142-Committee of Organic Materials for Information Science.

Primary Examiner—Stanley D. Miller
Assistant Examiner—Trong Quang Phan
Attorney, Agent, or Firm—Ostrolenk, Faber, Gerb & Soffen

[57] ABSTRACT

An improved ferroelectric liquid crystal light shutter device formed of an array of light shutter elements, each including a ferroelectric liquid crystal exhibiting a chiral smectic phase. The light shutter elements are divided into a plurality of groups for multiplexing in accordance with a predetermined duty ratio. The formerly memorized states of the light shutter elements belonging to one of the groups and the light shutter elements to be addressed in the next scanning sequence are erased. Thereafter, the erased light shutter elements are turned into a memorized "ON-state" or "OFF-state" in accordance with image data signals. The formerly memorized states of the light shutter elements other than those which are erased or memorized are maintained by the application of predetermined voltage levels.

5 Claims, 8 Drawing Sheets

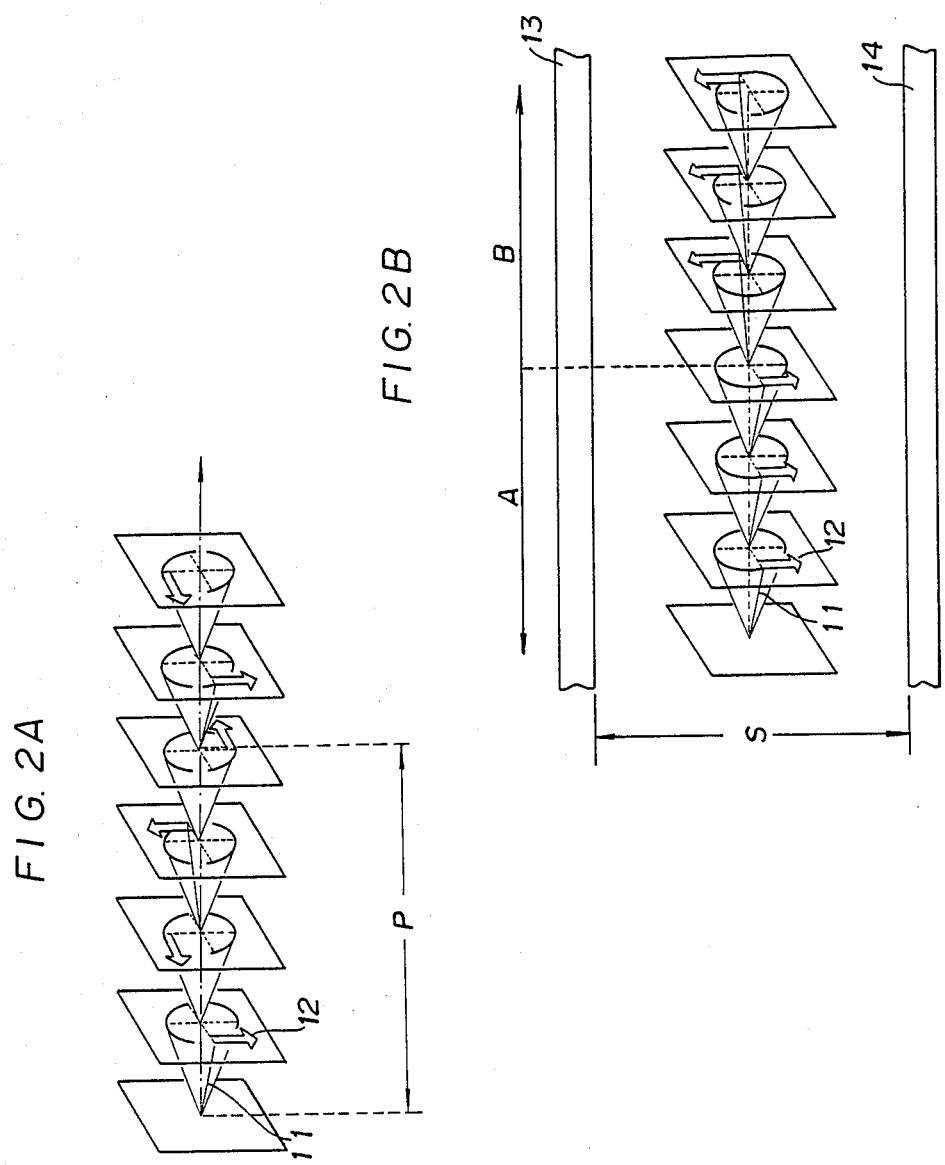

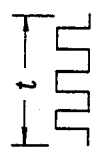
FIG.5B
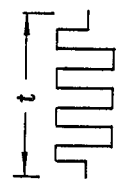
FIG.5C
FIG.5A

FERROELECTRIC LIQUID CRYSTAL LIGHT SHUTTER DEVICE AND METHOD OF CONTROLLING THE DRIVING OF THE SAME

FIELD OF THE INVENTION

The invention relates to a ferroelectric liquid crystal light shutter device and method of controlling the driving of the same, and more particularly to a ferroelectric liquid crystal light shutter device which is used for a printer head in an electrostatographic printing apparatus and method of controlling the driving of the same.

BACKGROUND OF THE INVENTION

There is an increasing demand for a high speed, high resolution and low price non-impact printer. Among the several kinds of non-impact printers on the market, laser printers are most practical because their advantage of high printing speed. However, there is a desire to decrease the size and manufacturing cost of such laser printers.

Recently, an optical printer utilizing a ferroelectric liquid crystal light shutter device has been proposed for experimental use. The ferroelectric liquid crystal light shutter device comprises a pair of glass substrates, a predetermined number N of transparent scanning electrodes provided on the inner surface of one of the glass substrates to be divided into, for instance, groups of four, N/4 signal electrodes provided on the inner surface of the other glass substrate each facing the corresponding scanning electrodes, alignment layers respectively covering the scanning electrodes and signal electrodes, spacers positioned between the glass substrates to provide a predetermined facing distance therebetween, polarizers provided on the respective outer surfaces of the glass substrates, and a layer of ferroelectric liquid crystal, exhibiting a chiral smectic phase, which is described in detail later, contained between the alignment layers. The layer of ferroelectric liquid crystal has a thickness of, for instance, $2.5\mu m$, that is, less than a helical pitch of its molecules. In other words, the predetermined facing distance of the spacers is selected to be that value. In general, the helical pitch is in the range of $3\mu m$ to $10\mu m$.

In operation, the scanning electrodes divided into groups of four are addressed with $\frac{1}{4}$ duty ratio multiplex driving so that scanning signals are applied thereto in a predetermined scanning time. The signal electrodes are driven in accordance with image data signals. As a result, light shutter elements each including an addressed scanning electrode and a driven signal electrode are turned on to pass light radiating from a light source whereby a photoconductor drum is exposed to provide a latent image thereon.

In the ferroelectric liquid crystal light shutter device, high speed response as fast as, for instance, 0.18ms is obtained as a result of the ferroelectric liquid crystal employed therein. This high speed switching response of ferroelectric liquid crystals is described in "Submicrosecond Bistable Electro-optic Switching in Liquid Crystals", authored by Noel A. Clark et al., at pages 899 to 901 of "Appl. Phys. Lett. 36(11), 1 June 1980".

In the proposed ferroelectric liquid crystal light shutter device, however, bistable switching is not as ideal as expected because the electric field reverse to the polarity of electric field for selecting light shutter elements is applied to ferroelectric liquid crystal portions each corresponding to the non-addressed scanning electrode and the selected signal electrode, so that it is difficult to maintain formerly memorized states in all of the corresponding light shutter elements. Such a reverse electric field is applied to all of light shutter elements including selected signal electrodes in the former half scanning time to erase former states of the light shutter elements to be selected in the latter half scanning time. Such a tendency of not maintaining the selected states of the non-addressed light shutter elements becomes particularly acute when the duty ratio for multiplex driving is higher because there is more time during which the scanning electrodes are not addressed, so that the influence of the reverse electric field becomes greater therein. Consequently, image contrast is decreased, so that the advantages of utilizing a ferroelectric liquid crystal are partially last.

Further, each scanning time consists of the former half time during which memorized states of the light shutter elements are erased and the latter half time during which some of the light shutter elements are selected, so that the scanning time necessary for a scanning electrode is twice the time necessary for a response of ferroelectric liquid crystal in light shutter elements so that the advantage of high speed ferroelectric liquid crystal response is not fully realized.

SUMMARY OF THE INVENTION

Accordingly, one object of the invention is to provide a ferroelectric liquid crystal light shutter device and method of controlling the driving of the same in which good bistable characteristics are obtained without complex circuitry.

Another object of the invention is to provide a ferroelectric liquid crystal light shutter device and method of controlling the driving of the same in which high speed switching can be achieved.

Accordingly, the invention is a ferroelectric liquid crystal light shutter device which comprises, an array of light shutter elements, light-modulated with predetermined duty ratio multiplex driving, the light shutter elements each including a scanning electrode addressed in a predetermined scanning order in accordance with the predetermined duty ratio multiplex driving, signal electrodes, a part of one of which faces the scanning electrode and to which a selecting or non-selecting signal is applied in accordance with image data signals read out of an image memory, a pair of glass substrates on the respective inner surfaces of which the scanning and signal electrodes are provided, a pair of alignment layers covering the scanning and signal electrodes, a pair of polarizers provided on the respective outer surfaces of the pair of glass substrates, and a layer of ferroelectric liquid crystal exhibiting a chiral smectic phase contained between the pair of said alignment layers, and means for controlling the array of light shutter elements to turn the elements on and off in the predetermined scanning order in accordance with said image data signals, Wherein the means for controlling the array of the light shutter elements erases the respective formerly memorized states the light shutter elements to be addressed in the next scanning sequence of the light shutter elements, turns the light shutter elements from which the formerly memorized states have been erased into an "ON-state" or an "OFF-state" in accordance with the image data signals, and maintain the formerly memorized states of the remaining light shutter elements.

The invention is also, a method for controlling the driving of a ferroelectric liquid crystal light shutter device which comprises, addressing respective groups of light shutter elements to be divided by a predetermined duty ratio for multiplex driving in a predetermined scanning order in accordance with the multiplex driving, the light shutter elements each including a scanning electrode to be arrayed, signal electrodes, a part of one of which faces the scanning electrode, a pair of glass substrates on the respective inner surfaces of which the scanning and signal electrodes are provided, a pair of alignment layers covering the scanning and signal electrodes, a pair of polarizers provided on the respective outer surfaces of the pair of glass substrates, and a layer of ferroelectric liquid crystal exhibiting a chiral smectic phase contained between said pair of said alignment layers, selecting light shutter elements to be turned into an "ON-state" or an "OFF-state" in accordance with image data signals read out of an image memory among the light shutter elements which are addressed, erasing the formerly memorized states of the group of light shutter elements which are to be addressed in the next scanning sequence, and maintaining the formerly memorized states of the groups of light shutter elements other than those which are addressed in the present scanning sequence and are to be addressed in said next scanning sequence.

BRIEF DESCRIPTION OF THE DRAWINGS

The invention will be explained in further detail in conjunction with appended drawings in which, FIGS. 2A to 2C are explanatory views showing phenomenons of a ferroelectric liquid crystal which is used in the proposed ferroelectric liquid crystal light shutter device of FIG. 1.

DESCRIPTION OF THE PREFERRED EMBODIMENT

Before describing a preferred embodiment of the invention, the aforementioned ferroelectric liquid crystal light shutter device will be explained in more detail.

Figure 1:
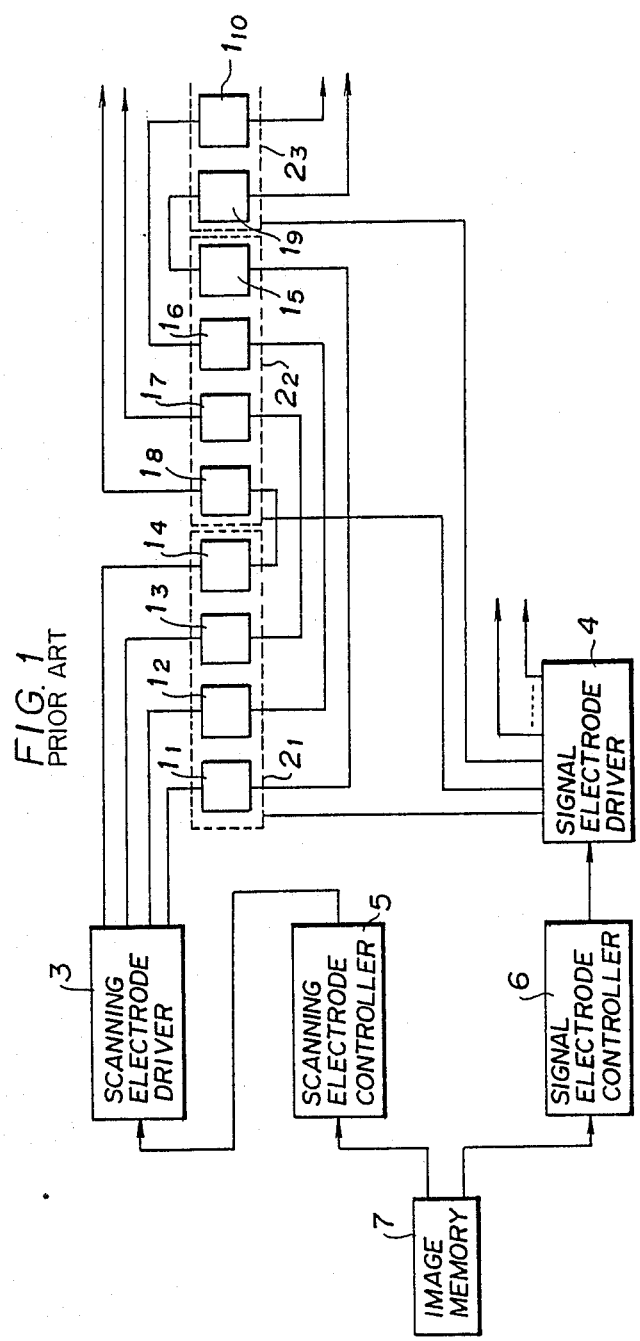
FIG. 1 is a block diagram showing a prior art ferroelectric liquid crystal light shutter device.

In FIG. 1, there is shown the ferroelectric liquid crystal light shutter device in which a predetermined number N of scanning electrodes $1_1, 1_2, 1_3$ ----- divided into groups of four for N/4 duty ratio multiplex driving and N/4 signal electrodes $2_1, 2_2, 2_3$ -----each facing the corresponding scanning electrodes $1_1$ to $1_4$, $1_5$ to $1_8$, $1_9$ to ----- are provided. The scanning electrodes $1_1$ to $1_4$ are connected in parallel to a scanning electrode driver 3, and also connected to the following scanning electrodes $1_5$ to $1_8$ respectively. Such a connecting pattern is repeated in the remaining scanning electrodes. On the other hand, all of the signal electrodes $2_1, 2_2, 2_3$ ----- are connected in parallel to a signal electrode driver 4. The scanning electrode driver 3 and signal electrode driver 4 are connected respectively to a scanning electrode controller 5 and signal electrode controller 6. The scanning electrode driver 3 is controlled in accordance with clock signals for reading image data signals out of an image memory 7 by the scanning electrode controller 5, while the signal electrode driver 4 is controlled in accordance with the image data signals read out of the image memory 7. As mentioned before, the scanning electrodes $1_1, 1_2, 1_3$ ----- are provided on the inner surface of one of the glass substrates which are not shown in FIG. 1, and the signal electrodes $2_1, 2_2, 2_3$ ----- are provided on the inner surface of the other one of the glass substrates. The ferroelectric liquid crystal contained in the light shutter device is also not shown in FIG. 1, nor are the alignment layers, spacers, polarizers and so on.

In FIG. 2A, there is shown a chiral smectic phase of ferroelectric liquid crystal contained in the liquid crystal light shutter device mentioned above. The molecules of the liquid crystal are designated by reference numeral 11 and the spontaneous polarizations of the molecules 11 are designated by reference numeral 12. As can be clearly understood from the illustration therein, the spontaneous polarizations 12 of the liquid crystal molecules 11 form a helical structure of a pitch P in the chiral smectic phase.

In FIG. 2B, there is shown a phenomenon in which the spontaneous polarizations 12 of the molecules 11 align along upward and downward directions in the chiral smectic phase of the ferroelectric liquid crystal in a case where the ferroelectric liquid crystal is confined between a pair of substrates 13 and 14, the facing space S of which is less than a helical pitch P mentioned above. As clearly shown therein, the spontaneous polarizations 12 of the molecules 11 are orientated downwardly in the region A, while they are orientated upwardly in the region B.

Figure 2C:
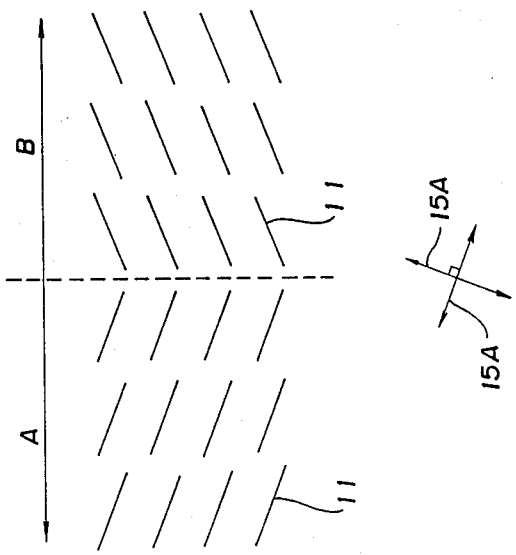

In FIG. 2C, there is shown the orientation of the molecules 11 as explained in FIG. 2B. In such an orientation of the molecules 11, the region A appears dark, while the region B appears bright in a case where the ferroelectric liquid crystal is sandwiched between a pair of polarizers (not shown), the facing space of which is less than the helical pitch P mentioned above and the polarized directions of which are perpendicular to one another as shown by 15A and 15B, while one of the polarizers coincides in its polarization with the orientation of the molecules 11 in the region A. In such a case, the region B appears brightest if the orientation of molecules 11 is oriented at an angle of 45° with respect to the polarized directions 15A and 15B, that is, is positioned in the center of the both directions 15A and 15B.

In the ferroelectric liquid crystal light shutter device mentioned before, such a pair of polarizers are provided on the respective outer surfaces of the glass substrates and the predetermined number N of light shutter elements are arrayed in accordance with a predetermined pattern.

Figure 3:
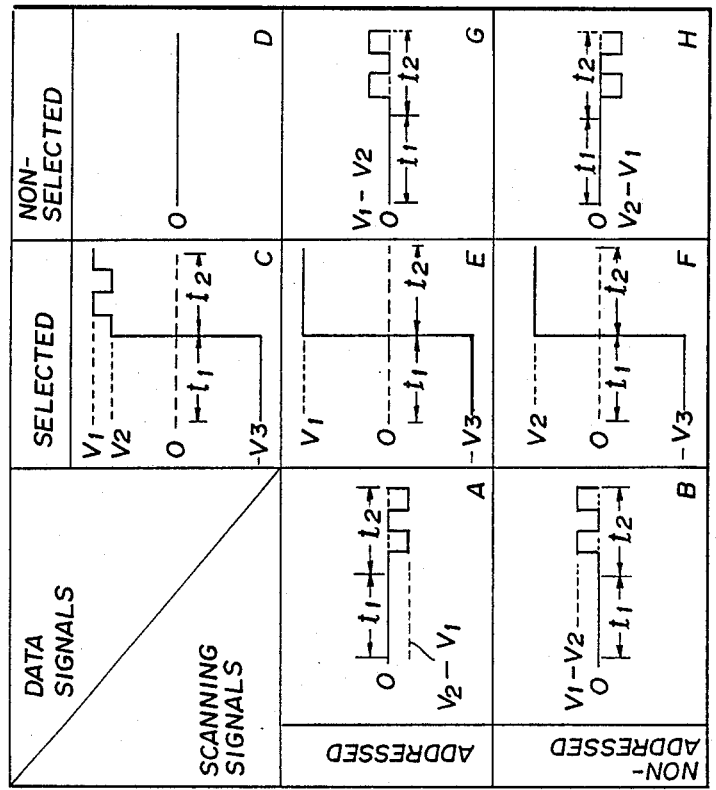
FIG. 3 is an explanatory diagram showing scanning signals for addressing scanning electrodes and selecting signals for selecting signal electrodes in the proposed ferroelectric liquid crystal light shutter device of FIG. 1.

Operation of the ferroelectric liquid crystal light shutter device mentioned above will be explained in conjunction with signal waves indicated in boxes A to H in FIG. 3.

The scanning signals for addressing shown in box A are applied from the scanning electrode driver 3 to the scanning electrodes $1_1$, $1_5$, $1_9$ ----- during the first quarter of a predetermined scanning cycle by control of the scanning electrode controller 5, while the scanning signals for non-addressing shown in box B are applied to the remaining scanning electrodes $1_2$, $1_3$, $1_4$, $1_6$, $1_7$, $1_8$, $1_{10}$ during the same period in the same manner. In the scanning signals for addressing and non-addressing, the period $(t_1+t_2)$ is equal to a quarter of the predetermined scanning cycle, and the level $|V_1-V_2|$ is based on the value $V_1$ greater than a threshold level $Vth_1$ which is applied to the ferroelectric liquid crystal to be turned into a state (called the "ON-state" hereinafter) shown in region A in FIG. 2C, and value $V_2$ less than the threshold level $Vth_1$. The selecting signals shown in box C or non-selecting signals in the box D are applied from the signal electrode driver 4 to the signal electrodes $2_1$, $2_2$, $2_3$ ----- depending upon the image data signals read out of the image memory 7 under control of the signal electrode controller 6. In the selecting signals, the level $V_3$ is greater in absolute value than a threshold level $Vth_2$ which is applied to the ferroelectric liquid crystal to turn it into a state (called the "OFF-state" hereinafter) shown in region B in FIG. 2C. As a result, an electric field in accordance with the voltage shown in box E is applied to the ferroelectric liquid liquid crystal of light shutter elements, each including a scanning electrode which has been addressed and a signal electrode which has been driven in accordance with the corresponding image data signal so that the formerly memorized state is erased under the level $-V_3$ thereof in each of the light shutter elements during the former period $t_1$ and an ON-state is newly memorized therein under the level $V_1$ thereof during the latter period $t_2$. On the other hand, electric fields in accordance with the voltages shown in boxes F to H are applied to the ferroelectric liquid crystal of the remaining light shutter elements correspondingly depending upon the addressing or non-addressing of the scanning electrodes, and upon the selecting or non-selecting of the signal electrodes.

In the next scanning sequence, the scanning signals for addressing shown box A are applied from the scanning electrode driver 3 to the scanning electrodes $1_2$, $1_6$, $1_{10}$ ----- during the second quarter of the predetermined scanning cycle under control of the scanning electrode controller 5, while the scanning signals for non-addressing shown in box B are applied to the remaining scanning electrodes $1_1$, $1_3$, $1_4$, $1_5$, $1_7$, $1_8$, $1_9$ -----. Thereafter, the same operation as in the first quarter of the predetermined scanning cycle is repeated.

In a ferroelectric liquid crystal light shutter device, however, the electric field created by the voltage shown in box F is applied to the ferroelectric liquid crystal of light shutter elements, each including a scanning electrode which has not been addressed and signal electrode which has been selected so that a memorized state is erased therein, thereby resulting in the deterioration of bistable switching. Further, the period $t_1$ for erasing the formerly memorized state must to be allocated in each selecting sequence, so that high speed switching is impossible to achieve.

Next, a ferroelectric liquid crystal light shutter device in a preferred embodiment of the invention will be explained.

Figure 4A:
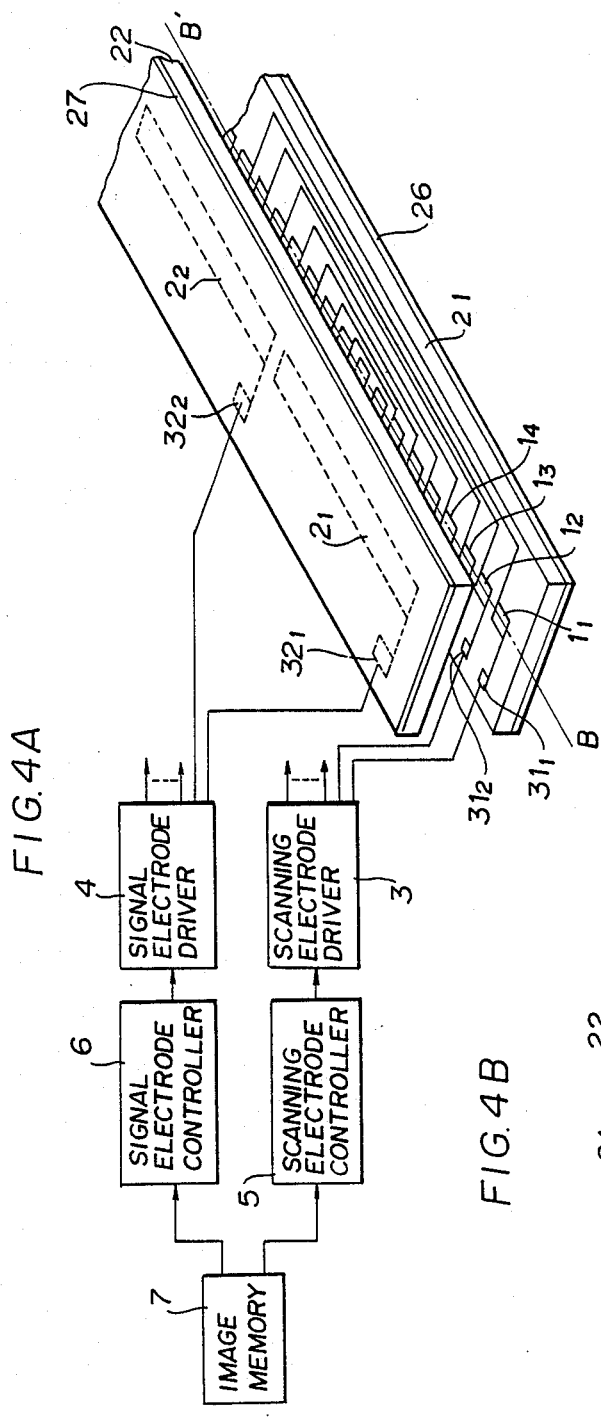
FIG. 4A is a perspective view illustrating a ferroelectric liquid crystal light shutter device in an embodiment of the invention.
Figure 4B:
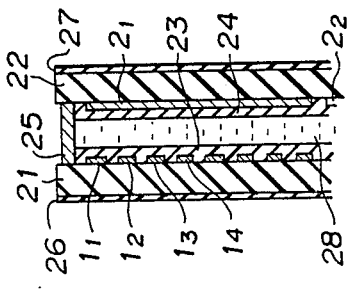
FIG. 4B is a cross-sectional view illustrating the ferroelectric liquid crystal light shutter device along the line B—B' in FIG. 4A, FIGS. 5A to 5C are explanatory diagrams showing electric fields applied to ferroelectric liquid crystal portions in light shutter elements in the ferroelectric liquid crystal light shutter device of FIGS. 4A and 4B.

In FIGS. 4A and 4B, there is shown the ferroelectric liquid crystal light shutter device which comprises a pair of glass substrates 21 and 22, a predetermined number N of transparent scanning electrodes $1_1$, $1_2$, $1_3$ ----- provided on the inner surface of the glass substrate 21 to be divided into groups of light for ⅛ duty ratio multiplex driving, N/8 signal electrodes $2_1$, $2_2$ ----- provided on the inner surfaces of the glass substrate 22 each facing eight corresponding scanning electrodes, alignment layers 23 and 24 respectively covering the scanning electrodes $1_1$, $1_2$, $1_3$ ----- and signal electrodes $2_1$, $2_2$ -----, spacers 25 positioned between the glass substrates 21 and 22, polarizers 26 and 27 provided on the respective outer surfaces of the glass substrates 21 and 22, and a layer 28 of ferroelectric liquid crystal exhibiting a chiral smectic phase contained between the alignment layers 23 and 24. The alignment layers 23 and 24 are formed by being subject to a rubbing treatment on the glass substrates 21 and 22 which are coated with polyimide and are positioned to provide a narrowed chamber with a facing distance of 2μm into which the ferroelectric liquid crystal layer 28 (preferably CS-1013 manufactured by CHISSO, Ltd.) is contained. The polarization angles of polarizers 26 and 27 are selected to pass light from a light source (not shown) when a voltage of 30V is applied to the ferroelectric liquid crystal layer 28 and to shut off the light when a voltage of $-30V$ or $-50V$ is applied thereto. The scanning electrodes $1_1$, $1_2$, $1_3$ ----- are connected through terminals $31_1$, $31_2$, $31_3$ ----- to a scanning electrode driver 3, while the signal electrodes $2_1$, $2_2$, $2_3$ -----are connected through terminals $32_1$, $32_2$, $32_3$ ----- to a signal electrode driver 4. The scanning electrode driver 3 and signal electrode driver 4 are controlled respectively by a scanning electrode controller 5 and signal electrode controller 6. The control of the scanning and signal electrode controllers 5 and 6 are based upon clock signals by which image data signals are read out of an image memory 7 and upon the image data signals.

Before explaining the operation of the ferroelectric liquid crystal light shutter device in the preferred embodiment of the invention, six types of voltages which are applied across the scanning electrodes $1_1$, $1_2$, $1_3$ ----- and signal electrodes $2_1$, $2_2$, $2_3$ -----will be described by referring to boxes N to U in FIG. 5A.

In boxes N and Q, positive pulses having a level $V_4$ less than a threshold level $Vth_1$ with which the ferroelectric liquid crystal of the layer 28 is turned into the "ON-state" are shown as being applied across the scanning electrodes which have not been addressed and signal electrodes which have been selected during a predetermined scanning period t. In Box O, a positive DC voltage having a level $V_1$ which is greater than the threshold level $Vth_1$ is shown as being applied across the scanning electrodes which have been addressed and signal electrodes which have been selected during the same period t. In box P, a negative DC voltage of a level $-V_{3a}$ which is greater in absolute value than a threshold level $-V_{th2}$ with which the ferroelectric liquid crystal of the layer 28 is turned into the "OFF-state" is shown as being applied across the scanning electrodes which have not been addressed, but have been addressed in the next scanning sequence and signal electrodes which have been selected during the same period t. In boxes R and U, negative pulses of a level $-V_4$ less in absolute value than $-V_{th2}$ are shown as being applied across the scanning electrodes which have not been addressed and signal electrodes which have not been selected during the same period t. In box S, a positive DC voltage of a level $V_2$ less than the threshold level $V_{th1}$ is shown as being applied across the scanning electrodes which have been addressed and signal electrodes which have not been selected during the same period t. Finally, in a box T, negative DC voltage of a level $-V_{3b}$ greater in absolute value than the threshold level $-V_{th2}$ is shown as being applied across the scanning electrodes which have not been addressed, but have been addressed in the next scanning sequence and signal electrodes which have not been selected during the same period t.

FIG. 5A shows that the predetermined number N of the scanning electrodes $1_1$, $1_2$, $1_3$ ----- are divided into a predetermined number n of groups for 1/n duty ratio multiplex driving and the scanning electrodes of the scanning order i ($1 \leq i \leq n$) have now been addressed. As a matter of course, the scanning electrodes of the scanning order (i+1) are to be addressed in the next scanning sequence and, if the scanning order i is equal to the number n, the scanning order (i+1) becomes the order 1. In the ferroelectric liquid crystal light shutter device as shown in FIGS. 4A and 4B, the number n is 8.

In boxes O, P, S and T, positive pulses as shown in FIG. 5B and bipolar pulses as shown in FIG. 5C may be used in place of the DC voltages shown therein if the mean value (or root-mean-square-value) thereof is selected to be of a predetermined value.

Figure 6:
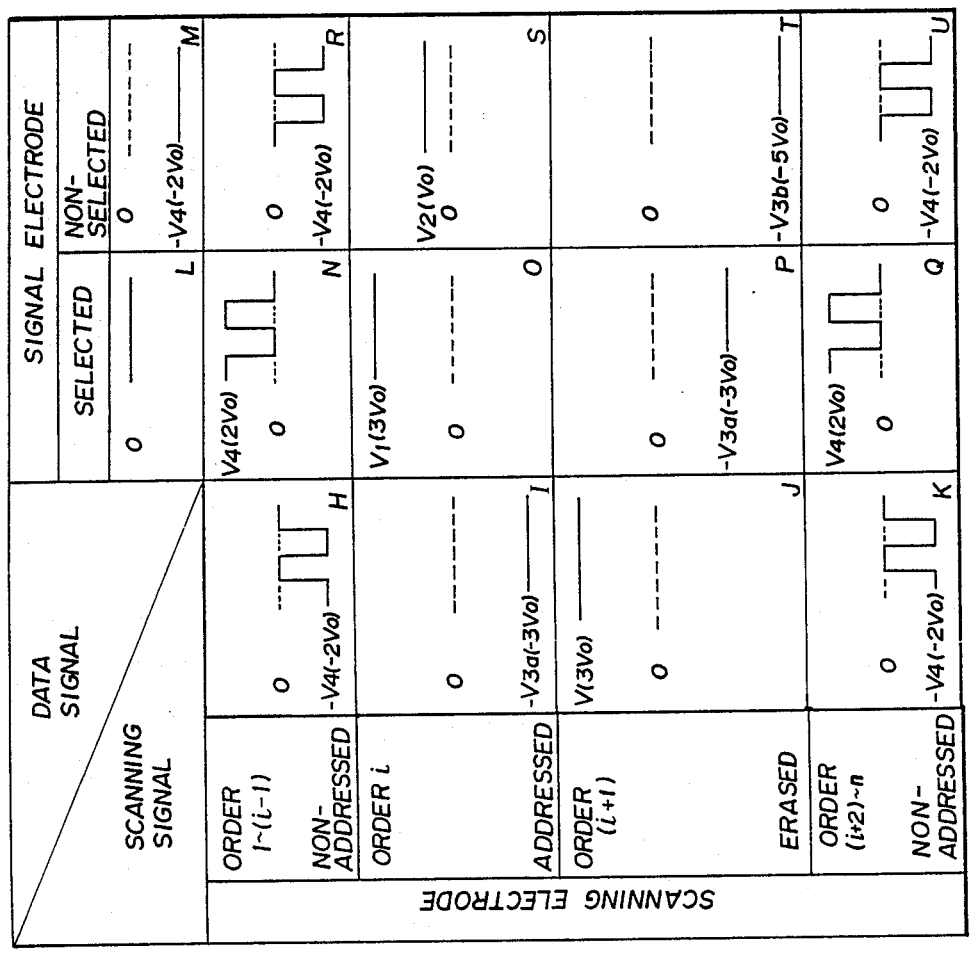
FIG. 6 is an explanatory diagram showing addressing and selecting signals for producing the electric fields of FIG. 5A.

FIG. 6 shows scanning signals for addressing and non-addressing which are applied from the scanning electrode driver 3 to the scanning electrodes $1_1$, $1_2$, $1_3$ ----- in accordance with the scanning order by control of the scanning electrode controller 5 and selecting and non-selecting signals which are applied from the signal electrode driver 4 to the signal electrodes $2_1$, $2_2$, $2_3$ ----- in accordance with the image data signals read out of the image memory 7 under control of the signal electrode controller 6. In boxes H to M, the scanning signals for addressing and non-addressing, and selecting and non-selecting signals are indicated in value based upon a standard voltage $V_0$ ($V_0$ = 10V in the embodiment), so that the respective levels in boxes H to M and also in boxes N to U are understood to have the following values;

$V_1 = 3V_0 = 30V$ $V_2 = V_0 = 10V$ $-V_{3a} = -3V_0 = -30V$ $-V_{3b} = -5V_0 = -50V$ $\pm V_4 = \pm 2V_0 = \pm 20V$

Although the negative DC voltages $-V_{3a}$ and $-V_{3b}$ in boxes P and T are shown as different in value, they may be equal to each other ($-V_{3a} = -V_{3b}$).

Operation of the ferroelectric liquid crystal light shutter device in the preferred embodiment of the invention will be explained as follows.

Figure 7:
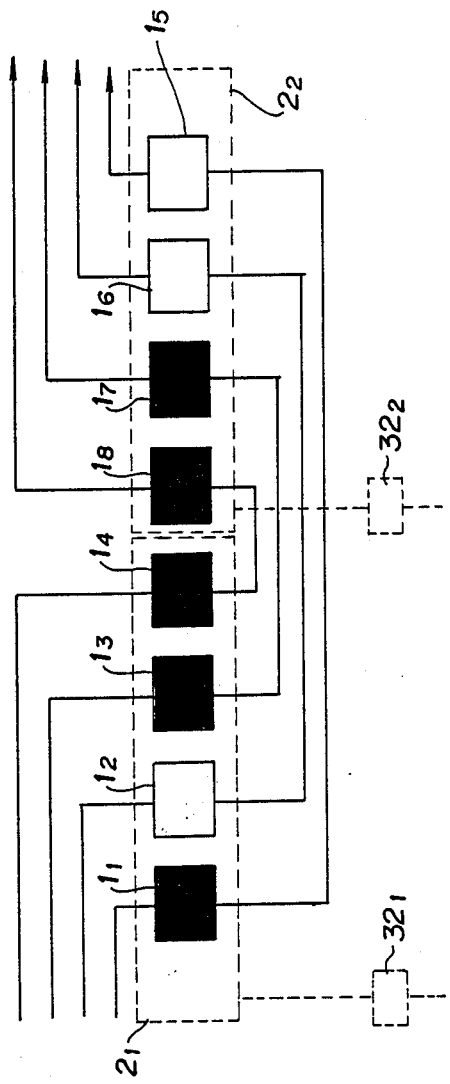
FIG. 7 is an explanatory diagram for explaining the operation of an embodiment of the invention.

In the operation thereof, it is assumed that the scanning electrodes $1_1$, $1_2$, $1_3$ ----- are divided into groups of four as shown in FIG. 7. In other words, the device is operated in $\frac{1}{4}$ duty ratio multiplex driving. For this purpose, the scanning electrodes $1_1$, $1_2$, $1_3$ and $1_4$ cooperate with the signal electrode $2_1$ having the terminal $32_1$ to apply predetermined electric fields based on the voltages shown in boxes N to U of FIG. 6 to the ferroelectric liquid crystal layer 28 in the light shutter elements, each including the scanning electrodes $1_1$, $1_2$, $1_3$ and $1_4$, while the scanning electrodes $1_5$, $1_6$, $1_7$ and $1_8$ cooperate with the signal electrode $2_2$ having the terminal $32_2$. In FIG. 7, it is assumed that the light shutter elements respectively including the scanning electrodes $1_2$, $1_5$ and $1_6$ (called "shutter elements $1_2$, $1_5$, and $1_6$" hereinafter) are in the "ON-state" as illustrated by unshaded blocks, while the light shutter elements respectively including the scanning electrodes $1_1$, $1_3$, $1_4$, $1_7$ and $1_8$ (called "shutter elements $1_1$, $1_3$, $1_4$, $1_7$ and $1_8$" hereinafter) are in the "OFF-state" as illustrated by shaded blocks.

Figure 8:
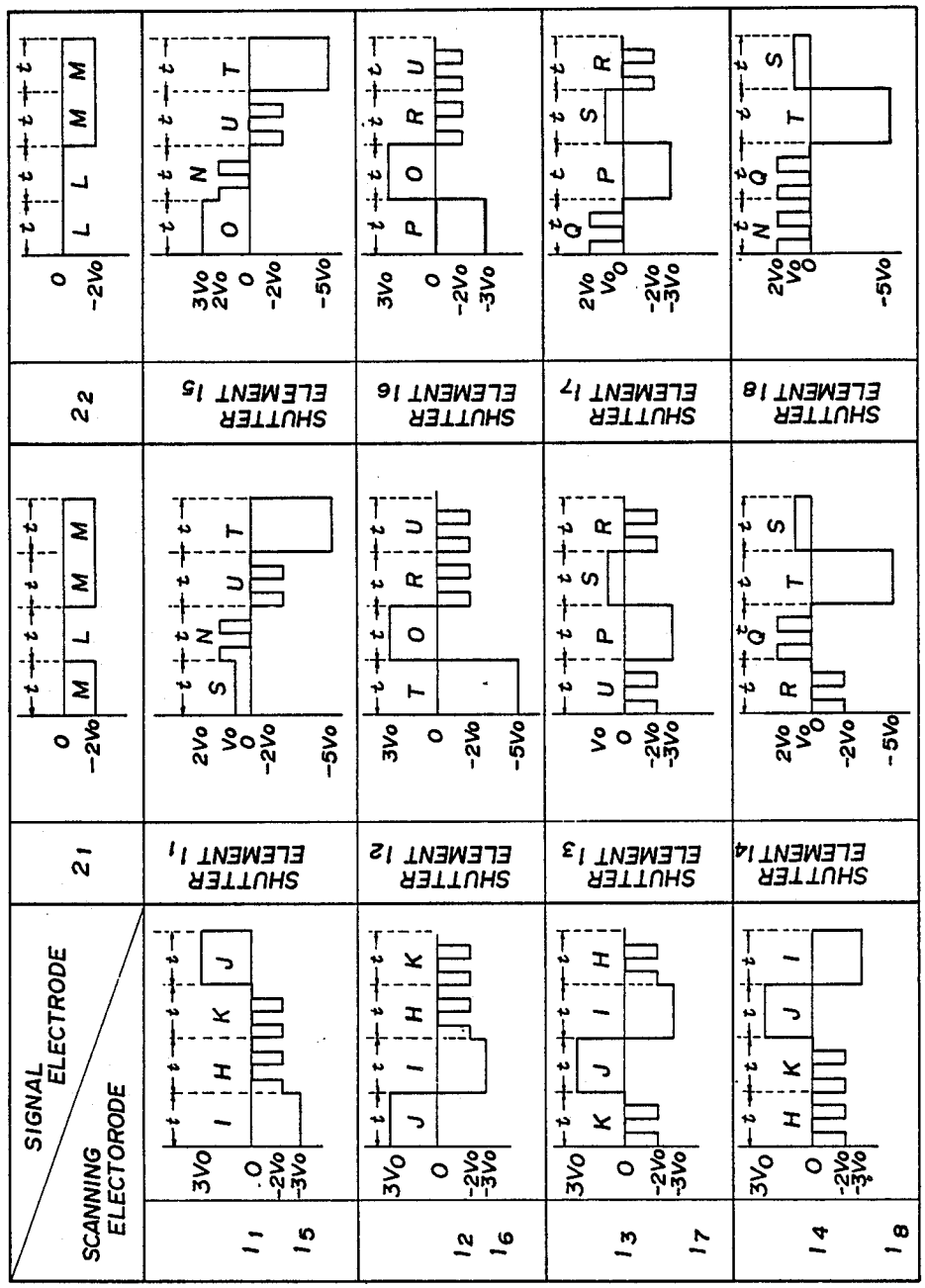
FIG. 8 is an explanatory diagram showing addressing and selecting signals for performing the operation shown in FIG. 7.

In FIG. 8, there are shown voltages to be applied to the scanning electrodes $1_1$ to $1_8$ and signal electrodes $2_1$ and $2_2$, wherein the reference symbols H to U in the boxes of FIGS. 5 and 6 are used to designate the same voltages. As can be clearly understood from the illustration therein, the shutter element $1_2$ is turned into the "ON-state" in the second scanning period t by application of the electric field based on the voltage O after the formerly memorized state is erased in the first scanning period t by application of the electric field based on the voltage T. Thereafter, the electric fields based on the voltages R and U are applied in the third and fourth scanning periods t to the shutter elements $1_2$ to maintain the "ON-state" until the "ON-state" is erased in the following erasing sequence. As a matter of course, the voltage T is results from the voltage J on the scanning electrode $1_2$ and voltage M on the signal electrode $2_1$, and the voltages O, R and U result respectively from the voltages I, H and K on the scanning electrode $1_2$ and voltages L, M and M on the signal electrode $2_1$, as shown in FIG. 6. The shutter elements $1_5$ and $1_6$ are also turned into "ON-state" in the first and second scanning periods t respectively by application of the electric fields based on the voltage O after the formerly memorized states are erased in the fourth and first scanning periods t respectively by application of the electric fields based on the voltages T and P. Thereafter, the "ON-states" are maintained in the shutter elements $1_5$ and $1_6$ until the next erasing sequence is applied thereto in the same manner as in the shutter element $1_2$.

On the other hand, the shutter elements $1_1$, $1_3$, $1_4$, $1_7$ and $1_8$ are not turned into the "ON-state" from the "OFF-state" because the electric fields based on the voltage O are not applied thereto after the formerly memorized states thereof are erased by application of the electric fields based on the voltage T or P. Such an operation described above is performed on the remaining shutter elements, each including a scanning electrode and signal electrode (which are not shown in FIG. 7) and is repeated in the following scanning sequences so that the light shutter device is turned on and off in accordance with the image data signals, whereby a photoconductor drum is exposed to have a latent image thereon corresponding to an image.

Although the invention has been described with respect to a specific embodiment to provide a complete and clear disclosure, the appended claims are not to be considered limiting, but are to be construed as embodying all modifications and alternative constructions that may occur to one skilled in the art which fairly fall within the basic teaching herein set forth.

What is claimed is:

1. A ferroelectric liquid crystal light shutter device, comprising:
an array of light shutter elements which are light-modulated by multiplex-driving the elements in groups in accordance with a predetermined duty ratio, said array comprising:
(i) a plurality of scanning electrodes respectively associated with respective elements of said array, said scanning electrodes being addressed in a predetermined order in accordance with said predetermined duty ratio,
(ii) a plurality of signal electrodes each facing a plurality of said scanning electrodes and to which a respective selecting or non-selecting signal is applied in accordance with image data signals read out of an image memory,
(iii) a pair of glass substrates on the respective inner surfaces of which said scanning and signal electrodes are provided,
(iv) a pair of alignment layers covering said scanning and signal electrodes,
(v) a pair of polarizers provided on the respective outer surfaces of said pair of glass substrates, and
(vi) a layer of ferroelectric liquid crystal exhibiting a chiral smectic phase contained between said pair of said layers, and
means interconnected with said scanning and signal electrodes for controlling said array of said shutter elements to be turned on and off in said predetermined order in accordance with said image data signals,
wherein said means for controlling said array of said light shutter elements erases the respective formerly memorized states of light shutter elements to be addressed in the next scanning sequence of said light shutter elements, turns said light shutter elements from which said formerly memorized states have been erased into an "ON-state" and "OFF-state" through application to the respective scanning and signal electrodes for each element of respective voltage signals selected in accordance with said image data signals in the next scanning sequence, and maintains the formerly memorized states of the remaining light shutter elements.

2. A ferroelectric liquid crystal light shutter device according to claim 1, wherein said means for controlling said array of said light shutter elements applies:
(i) a first predetermined voltage level, which is greater in absolute value than a second threshold voltage level under which said ferroelectric liquid crystal is turned into a second state, to said ferroelectric liquid crystal of said light shutter elements to be addressed in said next scanning sequence, thereby erasing said respective formerly memorized states thereof,
(ii) a second predetermined level of voltage, which is greater in absolute value than a first threshold voltage level under which said ferroelectric liquid crystal is turned into a first state, to said ferroelectric liquid crystal of said light shutter elements from which said formerly memorized states have been erased thereby turning the respective light shutter elements into an "ON-state" and an "OFF-state" in accordance with said image data signals in the next scanning sequence, and
(iii) a third predetermined voltage level, which is less in absolute value than said first and second threshold levels, to said ferroelectric liquid crystal of said remaining light shutter elements, thereby maintaining said formerly memorized states thereof.

3. A method for controlling the driving of a ferroelectric liquid crystal light shutter device, comprising:
addressing respective groups of light shutter elements to be light modulated by multiplex-driving the elements in accordance with a predetermined duty ratio, said groups of light shutter elements comprising:
(i) a plurality of scanning electrodes respectively associated with elements of said groups of light shutter elements,
(ii) a plurality of signal electrodes each facing a plurality of said scanning electrodes,
(iii) a pair of glass substrates on the respective inner surfaces of which said scanning and signal electrodes are provided,
(iv) a pair of alignment layers covering said scanning and signal electrodes,
(v) a pair of polarizers provided on the respective outer surfaces of said pair of glass substrates, and
(vi) a layer of ferroelectric liquid crystal exhibiting a chiral smectic phase contained between said pair of said alignment layers,
selecting light shutter elements which are addressed to be turned into an "ON-state" and an "OFF-state" through application to the respective scanning and signal electrodes for each element of respective voltage signals selected in accordance with image data signals read out of an image memory,
erasing the formerly memorized states of the group of light shutter elements which are to be addressed in the next scanning sequence, and
maintaining the formerly memorized states of the groups of light shutter elements other than those which are addressed in the current scanning sequence and those which are preselected to be addressed in the next scanning sequence.

4. A method for controlling the driving of a ferroelectric liquid crystal light shutter device according to claim 3, wherein said selecting comprises:
applying a DC voltage $V_1$ greater in absolute value than the first threshold voltage under which said ferroelectric liquid crystal is turned into a first state to light shutter elements selected in accordance with said image data signals and,
applying a DC voltage $V_2$ of the same polarity as said DC voltage $V_1$, but less in absolute value than said first threshold voltage ($|V_2| < |V_1|$) to light shutter elements not selected in accordance with said image data signals,
said erasing comprising applying a DC voltage $V_3$ greater in absolute value than the second threshold voltage under which said ferroelectric liquid crystal is turned into the second state to said light shutter elements which are to be addressed in the next scanning sequence, regardless of the selecting thereof in accordance with said image data signals, and wherein said step of maintaining comprises applying a pulse train of a voltage $V_4$ less in absolute mean value than said first and second threshold voltages and less in pulse width than a predetermined scanning period to said light shutter elements other than those which are addressed in the present scanning sequence and those to be addressed in the next scanning sequence.

5. A method for controlling the driving of a ferroelectric liquid crystal light shutter device according to claim 3, wherein said selecting comprises:

applying a pulse train greater in absolute mean value than said first threshold voltage to light shutter elements selected in accordance with said image data signals and, applying a pulse train less in absolute mean value than said first threshold voltage to light shutter elements not selected in accordance with said image data signals, wherein said step of erasing comprises applying a pulse train greater in absolute mean value than said second threshold voltage to said light shutter elements which are to be addressed in the next scanning sequence, regardless of the selecting thereof in accordance with said image data signals, and wherein said step of maintaining comprises applying a pulse train of a voltage $V_4$ less in absolute mean value than said first and second threshold voltages and less in pulse width than a predetermined scanning period to said light shutter elements other than those which are addressed in the present scanning sequence and those to be addressed in the next scanning sequence.

* * * * *